United States Patent
Schoppmeier et al.

(10) Patent No.: US 8,689,072 B2
(45) Date of Patent: *Apr. 1, 2014

(54) COMMUNICATION DEVICES AND METHODS WITH ONLINE PARAMETER CHANGE

(75) Inventors: Dietmar Schoppmeier, Unterhaching (DE); Gert Schedelbeck, Munich (DE)

(73) Assignee: Lantiq Deutschland GmbH, Neubiberg (DE)

( * ) Notice: Subject to any disclaimer, the term of this patent is extended or adjusted under 35 U.S.C. 154(b) by 256 days.

This patent is subject to a terminal disclaimer.

(21) Appl. No.: 13/198,694

(22) Filed: Aug. 4, 2011

(65) Prior Publication Data

US 2012/0204074 A1    Aug. 9, 2012

Related U.S. Application Data

(60) Provisional application No. 61/390,056, filed on Oct. 5, 2010.

(30) Foreign Application Priority Data

Sep. 3, 2010  (EP) .................................. 10009173

(51) Int. Cl.
*H04L 1/18* (2006.01)
*G08C 25/02* (2006.01)

(52) U.S. Cl.
USPC ........................................................ 714/748

(58) Field of Classification Search
USPC .................... 714/18, 748–749, 746
See application file for complete search history.

(56) References Cited

U.S. PATENT DOCUMENTS

| | | | | |
|---|---|---|---|---|
| 5,664,091 A * | 9/1997 | Keen | ............................... | 714/18 |
| 7,363,569 B2 * | 4/2008 | Pendakur et al. | ............. | 714/748 |
| 7,630,489 B2 * | 12/2009 | Oksman et al. | .......... | 379/392.01 |
| 8,112,687 B2 * | 2/2012 | Pons et al. | .................... | 714/748 |

* cited by examiner

*Primary Examiner* — Shelly A Chase
(74) *Attorney, Agent, or Firm* — SpryIP, LLC (57) ABSTRACT

Methods and devices are provided where when an online parameter change is requested a data transfer unit is stopped, a parameter change is communicated and the data transfer unit is started with changed parameters to generate new data transfer units.

22 Claims, 7 Drawing Sheets

COMMUNICATION DEVICES AND METHODS WITH ONLINE PARAMETER CHANGE

BACKGROUND

The present application relates to communication devices, communication systems incorporating such communication devices and communication methods with the possibility of an online parameter change.

Transmission of data between a transmitter and a receiver, for example wireline transmission like xDSL transmission or wireless transmission, is usually governed by a number of communication parameters which for example determine an amount of protection against various types of noise provided. In some cases, for example when noise conditions change during communication, a change of these parameters may be desirable. Online parameter change is a way of changing such communication parameters without completely stopping and newly setting up the communication connection used, for example without performing a complete handshake, initialization and training procedure performed when initially using a communication connection.

Sometimes in communication systems retransmission is used. Retransmission essentially means that if data sent from a transmitter to a receiver is not acknowledged by the receiver or not acknowledged within a predetermined time period, the data is sent again.

In such a system, when an online parameter change is to be performed, there may still be data left to be retransmitted with the old parameters.

SUMMARY

By stopping a data transfer unit framer and starting it again with changed parameters only after the parameter change has been communicated, time between stopping the data transfer unit framer and starting the data transfer unit framer may be used for other purposes, for example for emptying a retransmission buffer or otherwise completing outstanding retransmissions, which helps coordinating retransmission with the online parameter change.

DETAILED DESCRIPTION OF THE INVENTION

In the following, some embodiments of the present invention will be described in detail. It is to be understood that the following description is given only for the purpose of illustration and is not to be taken in a limiting sense. The scope of the invention is not intended to be limited by the embodiments described hereinafter with reference to the accompanying drawings, but is intended to be limited only by the appended claims and equivalents thereof.

It is also to be understood that in the following description of embodiments any direct connection or coupling between functional blocks, devices, components, circuit elements or other physical or functional units shown in the drawings or described herein could also be implemented by an indirect connection or coupling, i.e. a connection or coupling comprising one or more intervening elements. Furthermore, it should be appreciated that functional blocks or units shown in the drawings may be implemented as separate circuits in some embodiments, but may also be fully or partially implemented in a common circuit in other embodiments. In other words, the provision of functional blocks in the drawings is intended to give a clear understanding of the various functions performed, but is not to be construed as indicating that the corresponding functions are necessarily implemented in physically separate entities.

It is further to be understood that any connection which is described as being wire-based in the following specification may also be implemented as a wireless communication connection unless noted to the contrary.

The features of the various embodiments described herein may be combined with each other unless specifically noted otherwise. On the other hand, describing an embodiment with a plurality of features is not to be construed as indicating that all those features are necessary for practicing the present invention, as other embodiments may comprise less features and/or alternative features.

In some of the following embodiments, communication devices, systems and methods are described involving an online parameter change and involving retransmission. As an example, in the following description mainly wire based communication systems, in particular xDSL communication systems like ADSL systems or VDSL systems are used. For example, embodiments may be implemented in the context of ADSL2 systems as specified in ITU-T G.992.3, ADSL2+ systems as specified in ITU-T G.992.5 or VDSL2 systems as specified in ITU-T G.993.2. The terminology used with respect to the description of such embodiments correspond to standard terminology used for these systems and is to be construed accordingly unless in the following specification a definition of a specific term is given, in which case the definition given applies. However, such common terminology used is intended to encompass also corresponding elements in other types of communication than DSL communication, for example wireless communication.

Before describing any embodiments in detail, some terms used in the following will be described.

A parameter or communication parameter is generally a value which determines the way data is sent from a transmitter to a receiver, for example a parameter which determines a data rate, a protection against noise, a modulation, or the format of data transmitted.

A framing parameter is a parameter determining the format of a frame or unit of data.

An online parameter change refers to a change of one or more communication parameters without a complete restart of the communication system. Generally, in the context of the present application an online parameter change may for example involve a seamless rate adaptation (SRA) or an entering or leaving a low power mode, for example a L2 mode as defined in some xDSL standards.

Forward error correction (FEC) relates to subjecting data to be transmitted to a specific coding involving redundancy, for example Reed-Solomon encoding, such that if part of the data is lost the complete data may be reconstructed. In other words, for forward error correction the data is submitted to a specific coding thus generating code words which are then further processed for transmission.

A data transfer unit (DTU) is a unit of data which may be subjected as a whole to a coding for forward error correction and which comprises an identifier, in particular a sequence identifier (SID) and possibly a time stamp (TS), and is usable for retransmission.

Retransmission is a technique which increases the reliability of data transmission. In retransmission, data transfer units sent are acknowledged by a corresponding receiver using for example the identifier of the respective data transfer unit, and if the respective transmitter does not receive such an acknowledgement or receives a negative acknowledgement, the data transfer unit is retransmitted, i.e. transmitted again, possibly until a predetermined maximum time has expired. A data transfer unit in the context of xDSL transmission may contain an integer number of ATM (Asynchronous Transfer Mode) cells or an integer number of PTM (Packet Transfer Mode) code words. Furthermore, a data transfer unit may comprise an overhead for a checksum (Cyclic Redundancy Check) and so-called padding bytes.

A data transfer unit framer or DTU framer is an entity which generates data transfer units based on data to be transmitted.

Framing parameters for a DTU framer may for example comprise a number of Reed-Solomon codewords per DTU, a number of padding bytes per DTU or a framing type defining the DTU framing structure. Parameters for the retransmission of DTU may for example include a delay between two consecutive transmissions of the same DTU in case of retransmission or parameters defining a roundtrip time or half roundtrip time, roundtrip referring to the time needed for transmitting a DTU from a transmitter to a receiver and receiving the corresponding acknowledgement again at the transmitter. The above parameters are examples for communication parameters.

In some embodiments, in case of an online parameter change the online parameter change is requested with new desired parameter. In response to the request, a data transfer unit framer is stopped to avoid generation of new, i.e. fresh, data transfer units. The stopping may be performed immediately after the requesting of the online parameter change, or at some predetermined time after the requesting of the online parameter change. Then, a parameter change is communicated, and following the communication of the parameter change the data transfer unit framer is started with the changed parameters to again generate data transfer units.

For example, the requesting of the online parameter change may involve the corresponding signal sent from a receiver to a transmitter, and the communicating of the parameter change is then used by the transmitter to inform the receiver that the parameter change will now be applied.

Between the stopping and the starting, stored data transfer units may be retransmitted, for example to empty a retransmission buffer or otherwise complete outstanding retransmissions. In such an embodiment, after the starting of the data transfer unit framer no "old" data transfer units, i.e. data transfer units with the old parameters, remain to be retransmitted, which avoids problems which may arise from mixing transmission of "old" data transfer units and new data transfer units.

In an embodiment, a method is provided comprising: requesting an online parameter change with new desired parameters; stopping a DTU framer to avoid that fresh DTUs are sampled; communicating a parameter change; and starting the DTU with the changed parameters.

In some embodiments, the step of stopping stops the DTU until all stored DTUs are acknowledged positive.

The method may further comprise the step of suppressing the retransmission of new DTUs.

The method in some embodiments may further comprise the step of sending special signalling primitive to the receiver at a delta interface.

The OPC may be implemented via an overhead channel message in a return direction.

In some embodiments the parameters may be any or a combination of framing parameters Qtx, Q, M1, B10, R1, L1.

In an embodiment, a transmitter may receive the OPC request and wait until all Qtx DTUs have been acknowledged positive.

During this waiting time, the DTU framer may be stopped for avoiding that fresh DTUs are sampled.

In an embodiment, during this waiting time each positive acknowledged DTU is NOT discarded from the RTX buffer and a DTU is retransmitted every Qtx DTUs regardless of their ACK/NACK status.

In an embodiment, if a DTU has been acknowledged positive once its ACK/NACK status will not be overwritten anymore.

In an embodiment, when all Qtx DTUs in the RTX buffer have a positive ACK status the step of stopping is completed.

In an embodiment, each positive acknowledged DTU is discarded from the RTX buffer.

In an embodiment, every discarded DTU is replaced by a dummy DTU in the retransmission queue, and transmitted to the line.

In an embodiment, when all Qtx DTUs in the RTX buffer are dummy DTUs this step is completed.

A dummy DTU may be either a flag with the reserved timestamp value 0xFF or a last valid DTU before start of the stopping step.

The step of communicating may send a special signalling primitive to the receiver.

The special signalling primitive may be an L2 exit symbol as described in 8.7.6/G.992.3.

The special signalling primitive may also be an SS-Reverb, SS-Segue, or combinations thereof.

The parameter change may be sent as DTU symbol primitive.

In an embodiment, the parameter change is sent as Interleaving Parameter.

The method in some embodiments may further comprise the step of reconfiguring the RTX buffer with DTUs according to the new parameters.

The step of starting the DTU may restart RTX operation after showtime entry.

In an embodiment, the step of starting starts with the first DMT data symbol after the signal 'parameter change' and does not contain a rest of a DTU with the old parameters.

The method in some embodiments may further comprise the step of resetting the entities on the RTX sub-layer and between RTX sub-layer and delta interface before the step of starting.

The method in some embodiments may further comprise the step of inserting a rest phase after it is determined to start the DTU.

In an embodiment, a system is provided that is configured to practice the method according to any one of the alternatives described above.

In an embodiment, an apparatus is provided that is configured to practice the method according to any of the alternatives described above.

Some of the above concepts as well as additional optional features and examples for environments where such embodiments may be implemented will now be described with reference to the Figures.

Figure 1:
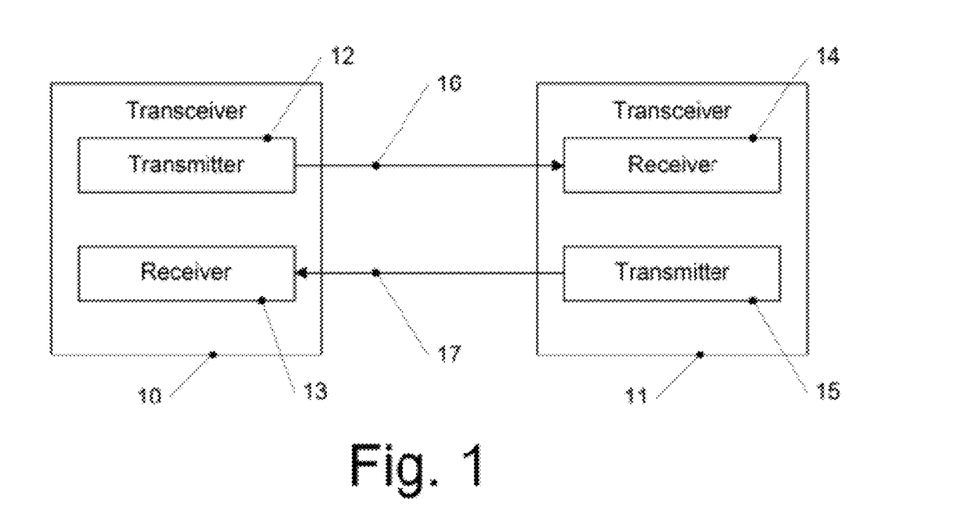
FIG. 1 shows a block diagram of a communication system according to an embodiment.

In FIG. 1, a communication system according to an embodiment is shown. The communication system shown in FIG. 1 comprises a first transceiver 10 and a second transceiver 11. First transceiver 10 comprises a first transmitter 12 and a first receiver 14, while second transceiver 11 comprises a second transmitter 15 and a second receiver 14. First transmitter 12 transmits data via a communication channel 16 to second receiver 14, and second transmitter 15 transmits data via a communication channel 17 to first receiver 13.

First transmission channel 16 and second transmission channel 17 may be implemented in the same physical medium, for example a wireline using xDSL transmission, where e.g. different frequency ranges are assigned to first transmission channel 16 and second transmission channel 17.

The data transmission from first transmitter 12 to second receiver 14 and/or the data transmission from second transmitter 15 to first receiver 13 may involve forward error correction and retransmission. In particular, the data may be transmitted using data transfer units (DTUs), and DTUs which have not been acknowledged as being received may be retransmitted. In case of an online parameter change, a DTU framer used for generating the DTUs may be stopped, and outstanding retransmissions may be completed before the DTU framer is started again with new, i.e. changed parameters, to again generate DTUs.

Figure 2:
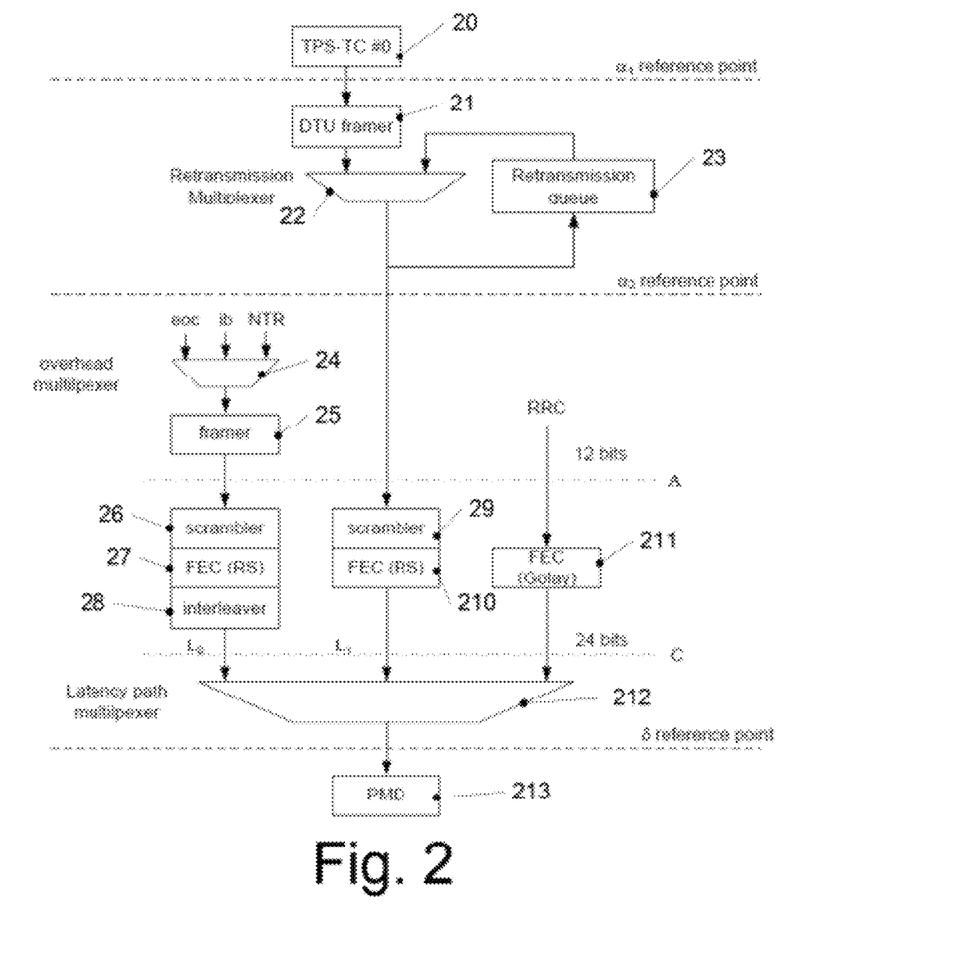
FIG. 2 shows a diagram illustrating a reference model of a communication device according to an embodiment.

In FIG. 2, a reference model for the implementation of retransmission and forward error correction in a transmitter of a transceiver in case retransmission is possible for both communication directions (for example the communication direction of communication channel 16 of FIG. 1 and the communication direction of communication channel 17 of FIG. 1) is shown. The reference model shown in FIG. 2 may in particular be implemented in xDSL systems.

In FIG. 2, a DTU framer 21 receives data to be transmitted, for example ATM cells or PTM cells, from a transmission protocol specific transmission convergence (TPS-TC) 20. A point between TPS-TC 20 and DTU framer 21 is also referred to as $\alpha_1$ reference point.

DTU framer 21 generates DTUs corresponding to parameters, in particular framing parameters, and forwards the DTUs to a first input of a retransmission multiplexer 22. A second input of retransmission multiplexer 22 is coupled to a retransmission queue 23 where previously transmitted DTUs are stored. Retransmission multiplexer 22 either selects a "new" DTU from DTU framer 21 or an "old", i.e. previously transmitted, DTU from retransmission queue 23 for transmission and forwards it to a scrambler 29. Furthermore, the output of retransmission multiplexer 22 is coupled with an input of retransmission queue 23, such that the DTUs output by retransmission multiplexer 22 are also stored in retransmission queue 23 to be available for retransmission if needed. When a transmitted DTU is then acknowledged by the respective receiver, it may e.g. be deleted from retransmission queue 23. A point between retransmission multiplexer 22 and scrambler 29 is also referred to as $\alpha_2$ reference point.

A forward error correction unit 210 is provided downstream of scrambler 29 which applies, in the embodiment of FIG. 2, Reed-Solomon encoding to the DTUs scrambled by scrambler 29. An output of forward error correction unit 210 is coupled with a first input of a latency path multiplexer 212. The data path via scrambler 29 and forward error correction unit 210 is also referred to as first latency path $L_1$.

A further latency path, labeled 0th latency path $L_0$, serves to transmit overhead data, i.e. control signals and the like. An overhead multiplexer 24 receives embedded operation channel (eoc) data, an indicator bit (ib) and/or a network timing reference (NTR) and selectively forwards these signals to a framer 25 which generates frames for the overhead channel. The frames generated are forwarded to a scrambler 26, a forward error correction unit 27 applying Reed-Solomon coding and an interleaver 28. An output of interleaver 28 is coupled with a second input of latency path multiplexer 212.

Furthermore, in the embodiment of FIG. 2 a retransmission return channel RRC is implemented which for example serves for acknowledging received DTUs. The acknowledgements, which may have a 12 bit format, are subjected to a forward error correction using an extended Golay Code in a forward correction unit 211, and the resulting data which is in the embodiment shown 24 bits data is fed to a third input of latency path multiplexer 212.

A point prior to scrambler 26, scrambler 29 and forward error correction unit 211 is also referred to as A, whereas a point between interleaver 28, forward error correction unit 210 and forward error correction unit 211 on the one side and latency path multiplexer 212 on the other side is also labeled C.

Latency path multiplexer 212 selectively forwards the data received at its three inputs to PMD (Physical Media Dependent) 213, i.e. ultimately to the physical transmission medium, for example a twisted line pair. For example, the data received from latency path multiplexer 212 may be mapped to data symbols for example using discrete multitone modulation (DMT) and transmitted over a wire line transmission medium according to an xDSL standard. A point or "interface" between latency path multiplexer 212 and PMO 213 is also referred to as δ reference point or δ interface.

As already mentioned, in embodiments, when parameters, for example framing parameters for DTU framer 21, are to be changed in an online parameter change, DTU framer 21 is stopped. Then, in some embodiments retransmission of DTUs in retransmission queue 23 is completed, e.g. only retransmission occurs until all DTUs have been acknowledged positive or corresponding time limits have expired. Following this, a signal is sent to the corresponding receiver to inform the receiver that now the parameter change will occur, and after that DTU framer 21 is started with the changed parameters to generate new DTUs.

It should be noted that in some embodiments retransmission may only be implemented in one transmission direction. In such cases, the retransmission return channel of FIG. 2 including forward error correction unit 211 may be omitted on the transmitter side of the communication direction employing retransmission, and on the corresponding receiver side only a retransmission return channel is implemented.

Next, with reference to FIGS. 3 and 4, embodiments of methods according to the present invention will be described. These methods may for example be implemented in the system and devices shown in FIGS. 1 and 2, but are not limited thereto. In the following description of methods, one transmission direction is contemplated, transmitter referring to the entity transmitting data in this transmission direction and receiver referring to the entity receiving the data. For example, in FIG. 1, for the transmission direction over transmission channel 16, transceiver 10, in particular transmitter 12 thereof, would be the transmitter, and transceiver 11, in particular receiver 13 thereof, would be the receiver.

Figure 3:
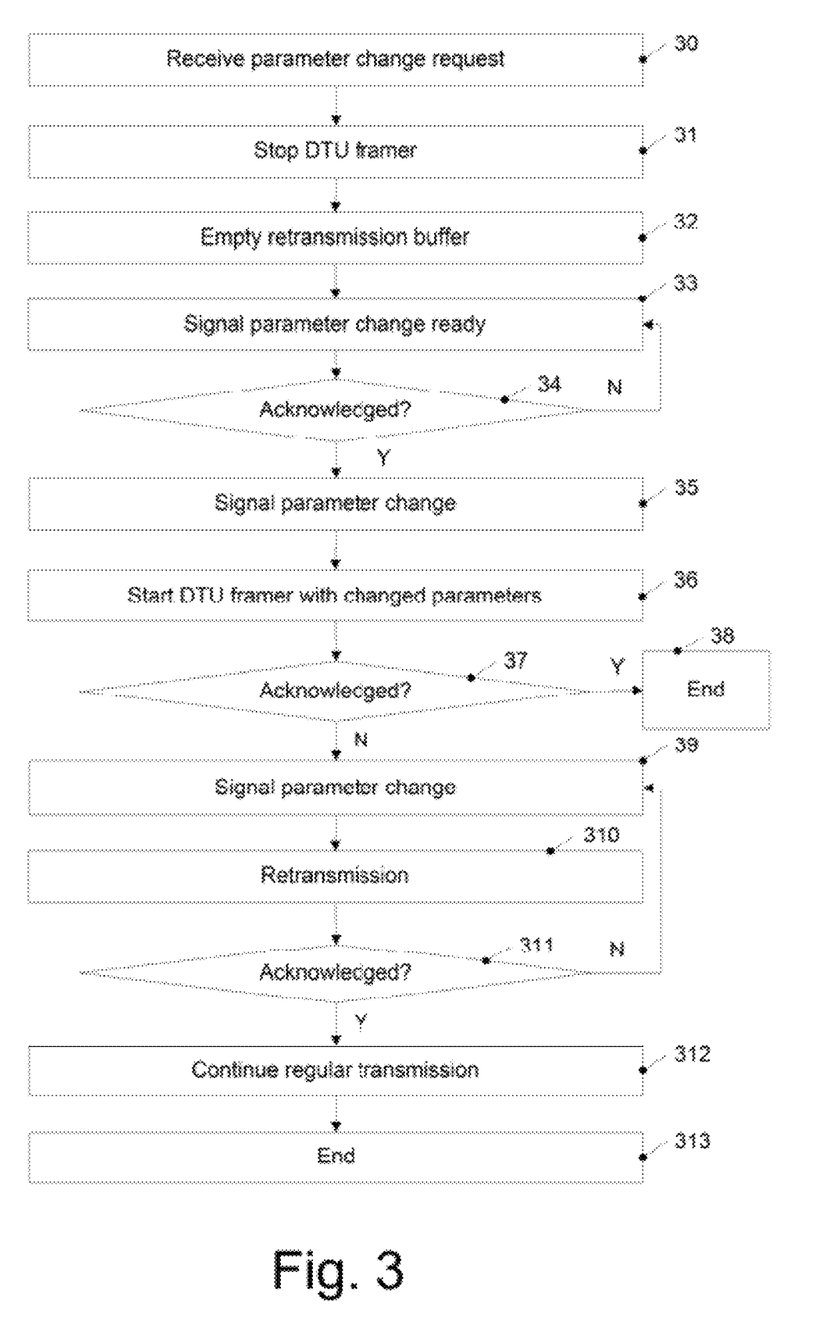
FIG. 3 shows a flow diagram illustrating a method according to an embodiment.

In FIG. 3, a flow diagram for illustrating some methods according to embodiments is shown, and in FIGS. 4A to 4D signal diagrams for illustrating various variations of such methods are described. It should be noted that, as will be explained in the following in more detail, methods according to embodiments need not comprise all the actions depicted in FIG. 3. In particular some embodiments only comprise some of the actions shown.

First, referring to FIG. 3, FIG. 4A and FIG. 4B, an embodiment of a method will be described which involves only the action represented by boxes 30-32, 35 and 36 of FIG. 3.

At 30 in FIG. 3, a receiver receives a parameter change request from a transmitter. For example, the receiver may detect that noise conditions on a communication channel used have changed. In some cases, noise may have increased, which may necessitate a change of the parameters for increased noise protection. In other cases, noise may have decreased, which may make a change of parameters for reduced noise protection, but increased data rate, possible.

Figure 4A:
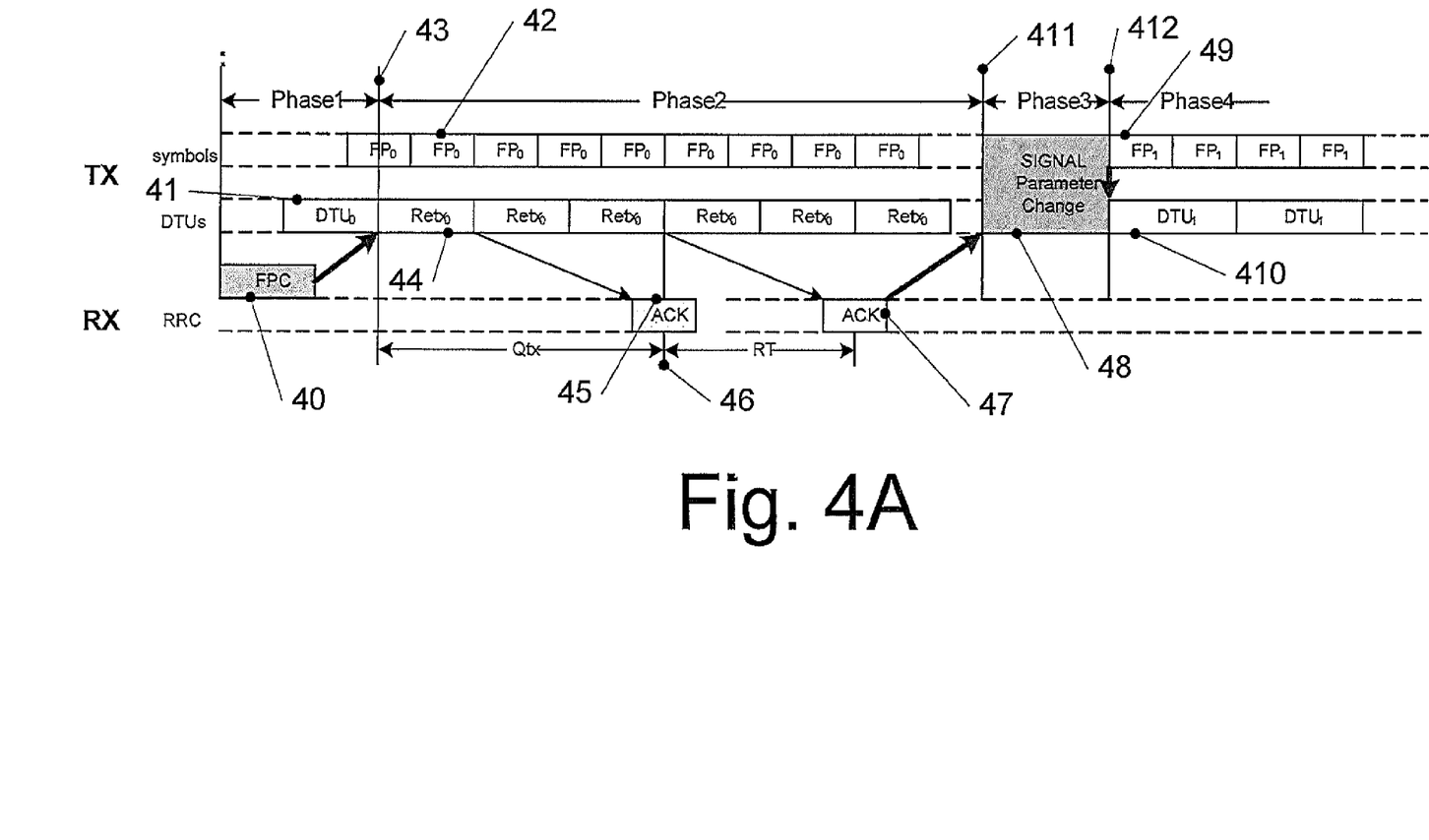
FIG. 4A to 4D show signal diagrams illustrating different embodiments.

In FIG. 4A, this is represented in a part labeled phase 1 ending at 33. In FIG. 4A, it is assumed that data transfer units are transmitted by the corresponding data being mapped to symbols. The symbols transmitted by the transmitter (TX) are represented in the first line of FIG. 4A, and the data transfer units are represented in the second line. Below that, signals sent back to the transmitter from the receiver are depicted, in particular a retransmission return channel RRC. 40 labels a framing parameter change request FPC, i.e. a request form the receiver that framing parameters used for generating DTUs are changed, which is an example for an online parameter change request. The request may for example be transmitted via an overhead channel message and/or an overhead channel command. The request is received by the transmitter at 33. Prior to receiving the request, the transmitter, in particular a DTU framer thereof, generates DTUs 41, labeled $DTU_0$, with the framing parameters prior to any change (also referred to as "old" parameters hereinafter), which are mapped to symbols 42 labeled $FP_0$ also based on the framing parameter before the change.

Returning to FIG. 3, when the parameter change request, which may comprise new desired parameter values, is received, at 31 a DTU framer of the transmitter is stopped such that no new DTUs are generated. This may for example be performed in the embodiment of FIG. 3 by not transmitting any further data to DTU framer 21, for example via the $\alpha_1$ reference point in FIG. 2. In FIG. 4A, this occurs at 43. While in FIG. 4A the stopping of the DTU framer occurs immediately after receipt of the parameter change request 40 at the transmitter, in other embodiments the stopping may occur some predetermined time period after or at some predetermined time after receiving the parameter change request 40.

At 32 in FIG. 3, the retransmission buffer is emptied, i.e. DTUs to be retransmitted are sent to the receiver. In other words, outstanding retransmissions are completed. This generally occurs during a time labeled phase 2 in the example of FIG. 4A. The retransmitted DTUs (which are in the format according to the framing parameters prior to the request 40) are labeled 44 in FIG. 4A and generally designated $Retx_0$ in FIG. 4A.

After a time Qtx, which is the delay between two consecutive transmissions of the same DTU, all DTUs transmitted prior to 43 have been retransmitted at least once if needed. In other words, if the last DTU before time 43 needs to be retransmitted, its retransmission is completed at the time labeled 46 in FIG. 4A.

The retransmitted DTUs 44, if correctly received by the receiver, are acknowledged via the retransmission return channel, as depicted by acknowledgements 45 and 47 in FIG. 4A. Acknowledgement 47 is an acknowledgement for the retransmission of the last DTU before 43, i.e. the retransmission before 46, which is after a half roundtrip time RT after 46. When all retransmitted DTUs are acknowledged positive, which in the example shown in FIG. 4A is the case at a time 411 when the acknowledgement 47 is received by the transmitter, phase 2 is ended. Between time 46 and time 411, for example dummy DTUs may be used as retransmitted DTUs 44, or previously retransmitted DTUs may be retransmitted again even if they have been acknowledged positive or are not yet due for transmission as the corresponding time Qtx has not yet expired. A dummy DTU may be a DTU flagged with a reserved time stamp value, for example 0xFF, or may be the last DTU before the state of phase 2, i.e. before time 43, re-used as dummy DTU.

In the second phase, there are generally different alternatives how retransmission may be handled. In an embodiment, each positive acknowledged data transfer unit is not discarded from the retransmission, and a data transfer unit is retransmitted every Qtx data transfer uses units regardless of their status as acknowledged or not acknowledged. In such an embodiment, if a DTU has been acknowledged positive once its status will not be overwritten anymore, i.e. further non-acknowledgement will not change the status as acknowledged. When all data transfer units in the retransmission buffer have a positive acknowledgement status in an embodiment the second phase is finished.

In another embodiment, each positive acknowledged data transfer unit is discarded from the retransmission buffer and replaced by a dummy data transfer unit in the retransmission queue and transmitted to the line in an appropriate time. In such an embodiment, when all data transfer units (altogether Qtx data transfer units) in the retransmission buffer are dummy data transfer units, the second phase is finished.

In a further embodiment, each positive acknowledged data transfer unit is discarded from the retransmission buffer without being replaced by a dummy or other data transfer unit until there is only one data transfer unit in the buffer, such that in such a case only an acknowledged or negative acknowledge data transfer units will be sent until all data transfer units have been positive acknowledged. In such an embodiment, the time during which the DTU framer is stopped may be shortened, for example if an actual noise scenario has less noise than the currently configured noise scenario.

It should be noted that in case not all DTUs are acknowledged positive, phase 2 may be longer than depicted as in this case retransmitted DTUs may have to be retransmitted again. On the other hand, if all DTUs transmitted before phase 43 are acknowledged positive after the corresponding roundtrip time, phase 2 may be shorter as no retransmission is needed. In some embodiments, the minimum time allocated to phase 2 is the roundtrip time for the last DTU sent before 43, i.e. the time it takes to receive an acknowledgement for the DTU sent immediately preceding 43 at the transmitter.

Returning to FIG. 3, when the retransmission buffer has been emptied at 32 and all DTUs (retransmitted or transmitted for the first time) have been acknowledged positive, at 35 a parameter change is signaled from transmitter to receiver (as mentioned, 33 and 34 are not implemented in the alternative currently discussed with reference to FIG. 4A).

The parameter change signal has the purpose of signaling to the receiver that following the parameter change signal, new parameters, for example the parameters requested with the parameter change request at 30, will be applied. The parameter change signal may be a special signaling primitive, for example may be sent at the delta reference point using specific DMT symbols. For example, a L2 (low power mode) exit symbols as defined for example in ITU-T G.992.3, an SS-Reverb, an SS-Segue or a combination thereof may be used. However, any kind of predetermined signal may be used.

It should be noted that the time assigned to phase 2 may be limited, for example to prevent an "endless" extension of phase 2 in case the actual noise scenario is greater than the configured noise scenario. In an embodiment, the minimum for this time limit is defined such that such an actual equal noise scenario can still be handled after one roundtrip of error-free data from beginning of phase 2, i.e. the maximum time limit is greater than or equal to Qtx+Nret·Qtx, Nret being a maximum number of retransmissions of the same DTU.

After the signaling of the parameter change at 35 in FIG. 3, at 36 the DTU framer is started with the changed, i.e. new, parameters. This is shown in phase 4 of FIG. 4A as an example at the time 412, where DTUs 410 labeled $DTU_1$ and symbols 49 labeled $FP_1$ generated with new parameters are transmitted. As at this point in the embodiment shown the retransmission buffer is emptied, i.e. all DTUs have been retransmitted as necessary, no retransmission of any DTU with the old parameters is necessary at this point, such that the transmission now can be performed completely with the new parameters.

In the example of FIG. 4A, DTUs 410 and symbols 49 with the new parameters are immediately transmitted after the end of phase 3, i.e. starting with 412 which corresponds to a point in time assigned to the parameter change. However, in some cases symbol boundaries and DTU boundaries may not match, as for example in some xDSL environments a single DTU may correspond to 0.5-4 symbols. As the changed parameters may comprise both symbol parameters and DTU parameters and in some cases may also influence an overhead channel which again may have different "natural" boundaries between units transferred, in some embodiments the new parameters are applied at the next "natural" boundary of the respective entity. An example is shown in FIG. 4B which is a variation of FIG. 4A. In contrast to FIG. 4A, in case of FIG. 4B the transmission of symbols 49 with the new parameter starts immediately after 412, but the transmission of DTUs 410 with the new boundaries starts only at the next DTU boundary after 412. Between 412 and the boundary, a "rest", i.e. a remaining portion, of a previous DTU (according to the old parameters) bearing reference numeral 413 in FIG. 4B is transmitted. Rest 413 may be a second portion of a DTU, a corresponding first portion being transmitted immediately preceding 411.

Next, additions to the embodiment to far discussed with respect to FIG. 3 will be discussed. In a first modification, additionally the actions labeled 43 and 34 in FIG. 3 are implemented, and an example for corresponding signals is shown in FIG. 4C. The acts described with respect to FIG. 4A or 4B corresponding to the acts at 30-32 remain the same. In other words, compared to FIGS. 4A and 4B until 411 the method is the same in this embodiment.

However, after the transmission buffer has been emptied at 32, in the currently discussed embodiment at 33 a parameter change ready signal is signaled to the receiver. In other words, an extension to phase 3 labeled phase 3 ET1 is implemented in this embodiment, where the parameter change signal 48 transmitted at 35 in FIG. 3 is preceded by a parameter change ready signal 414, which is a kind of pre-warning for the imminent parameter change.

When this parameter change ready signal is received at the receiver, a corresponding acknowledge is signaled symbolized by 415 in FIG. 4C. When the acknowledge is received again by the transmitter at 416, the parameter change signal 48 is sent as in FIG. 4A. In case the acknowledge is not received, for example when the parameter change ready signal is lost or the acknowledge signal is lost, in some embodiments the parameter change ready signal may be sent again. This is symbolized by 34 in FIG. 3, where, when the parameter change ready signal is acknowledged, the method proceeds at 35, while it goes back to 33 if there is no acknowledgement.

After the parameter change ready signal, as shown in FIG. 4C, up to the parameter change signal, dummy DTUs may be sent.

In a further embodiment, additionally the actions described at 37-313 in FIG. 3 are implemented, which will now be described referring also to FIG. 4D which shows an example for signals exchanged in such an embodiment.

Figure 4B:
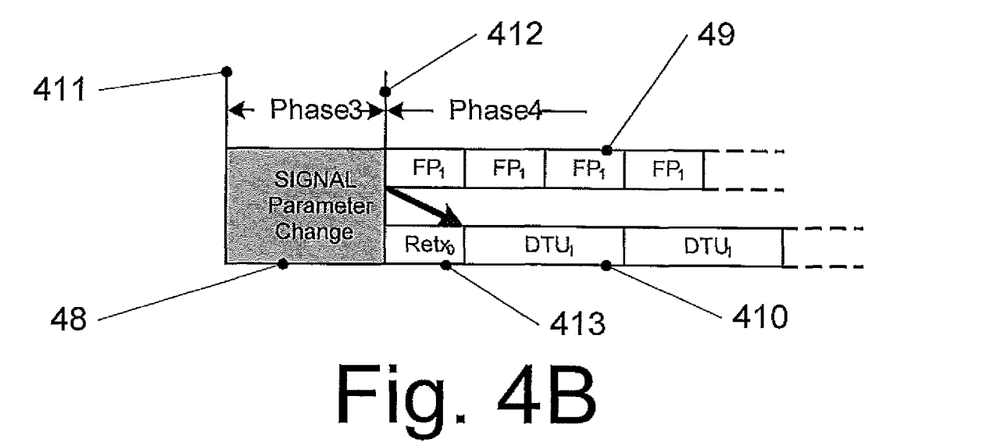
Figure 4C:
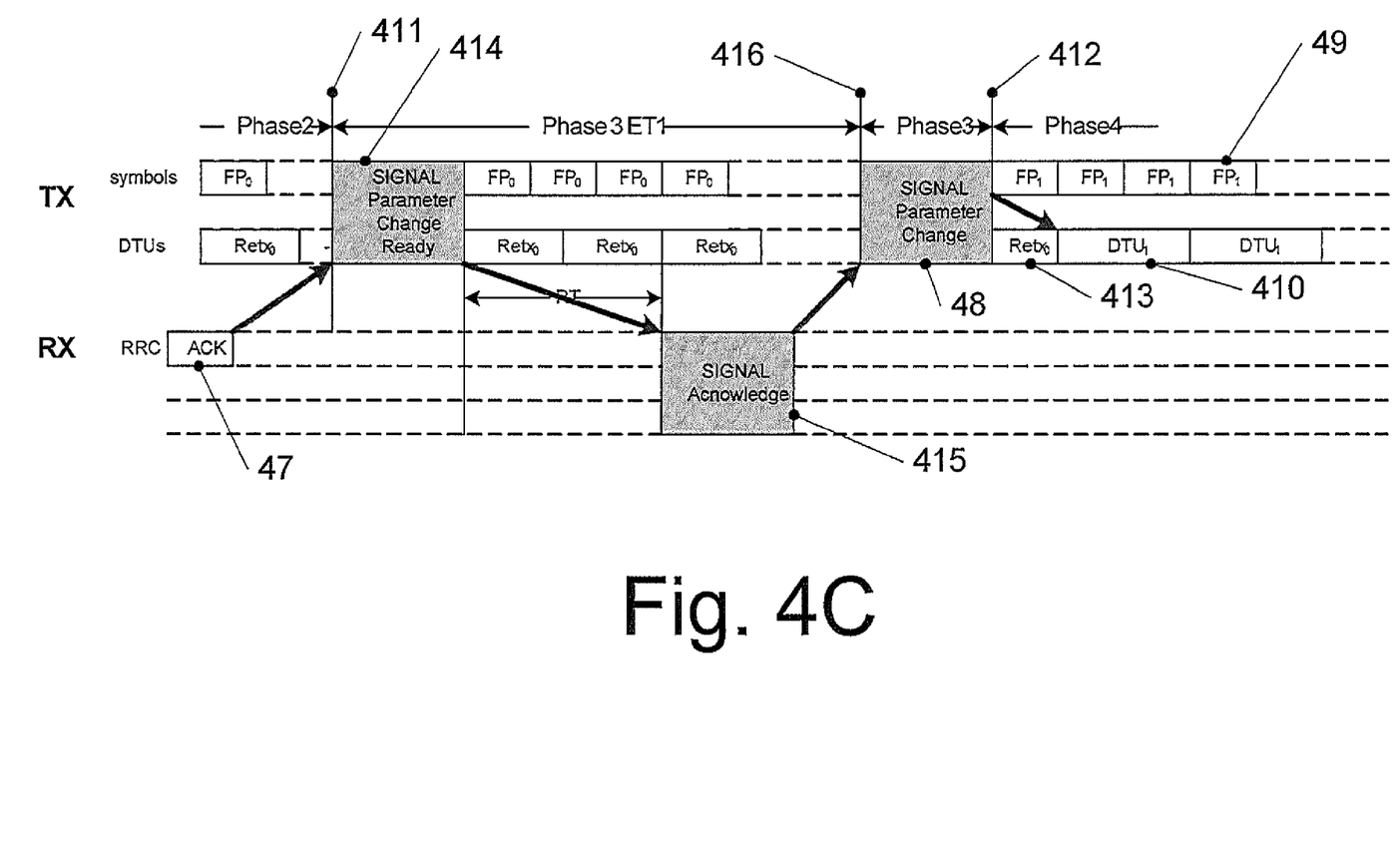
Figure 4D:
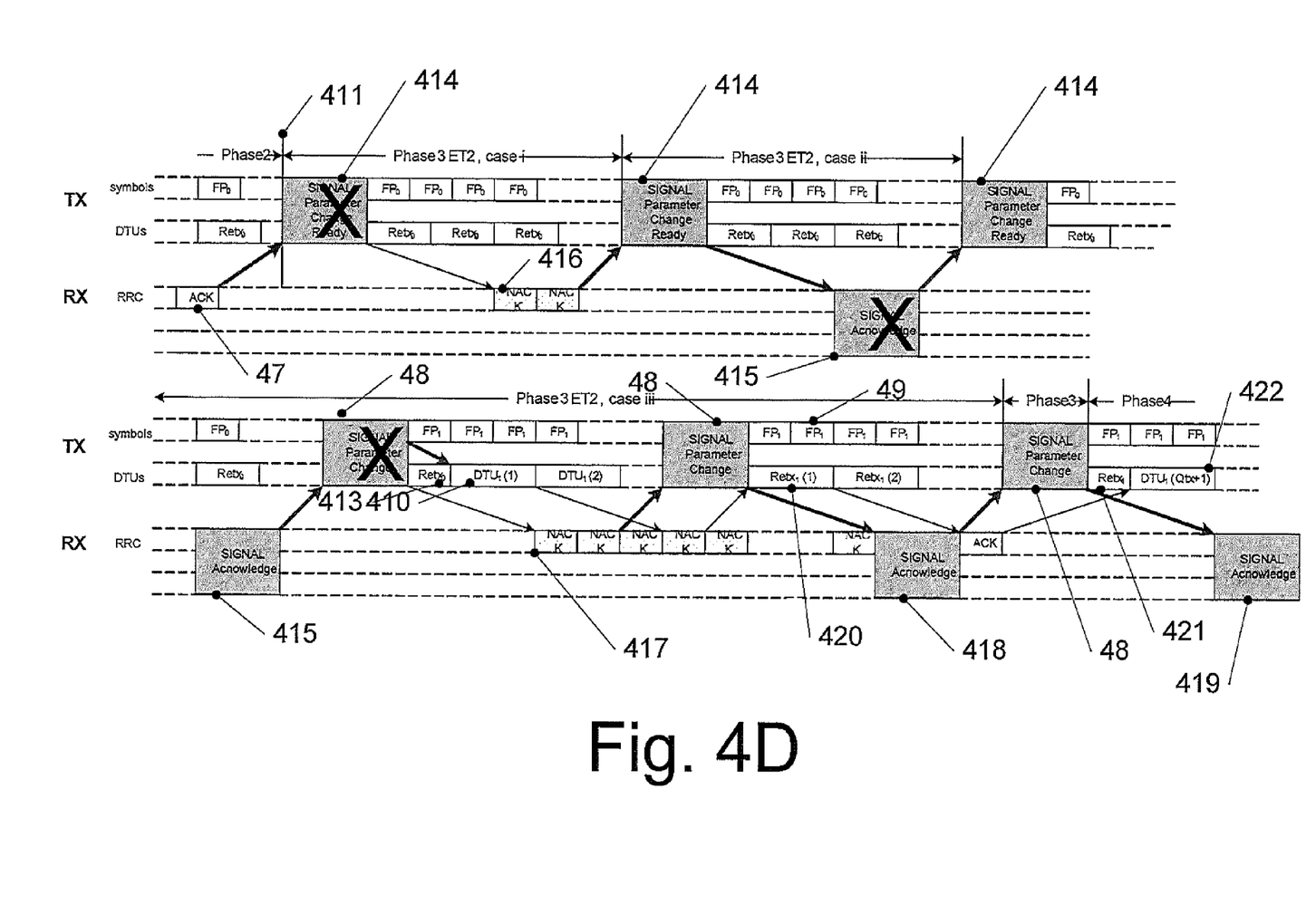

Similar to FIGS. 4B and 4C, also in FIG. 4D only those parts changed with respect to FIG. 4A or 4B are shown. In particular, until the end of phase 2, i.e. until time 411, the same signals are sent in FIG. 4D as in FIG. 4A.

First of all, in FIG. 4D also a case is shown where the parameter change ready signal transmitted at 33 is not acknowledged and sent again. In this respect, in FIG. 4D a signal crossed out with an X is a signal not received.

In FIG. 4D, phases labeled phase 3 ET2 case i and phase 3 ET2 case ii correspond to the mechanism already described with reference to FIG. 4C which are an example for an implementation of the actions at 33 and 34 of FIG. 3.

In the example of FIG. 4D, a first parameter change ready signal 414 gets lost. At 416, corresponding NACK, i.e. no acknowledgement, signals are sent. In response thereto, a second parameter change ready signal 414 is transmitted. In this case, the acknowledge signal 415 in the example shown gets lost. As the transmitter does not receive the acknowledge signal, a third parameter change ready signal 414 is then sent, which in the example shown is then error-free acknowledged by an acknowledge signal 415.

When an acknowledge signal 415 acknowledging receipt of the parameter change ready signal is received by the transmitter, as already explained at 35 a parameter change signal is transmitted, and after that a DTU framer is started with changed parameters at 36. In the modification currently discussed, also for the parameter change signal an acknowledgement mechanism is installed. In case the parameter change signaled at 35 is acknowledged positive, at 38 the method is ended, this essentially corresponding to the case already explained with reference to FIG. 4C. In case the parameter change signaled at 35 is not acknowledged, at 39 the parameter change is signaled again, followed by a retransmission of already transmitted DTUs with the changed parameters at 310. This is repeated until at 311 a parameter change is finally acknowledged positive. In this case, at 312 the regular transmission of DTUs is continued, and at 313 the method is ended.

These actions and some additional features will now be explained referring again to the example of FIG. 4D.

In the example of FIG. 4D, a first parameter change signal 48 in a phase labeled phase 3ET2 case ii gets lost, symbolized again by a cross out. As a result, the receiver is not notified of the imminent parameter change. Consequently, the following DTUs 410 with the new parameters are all responded to with not acknowledged (NACK) signals 417 via the retransmission return channel, as with the old parameters the receiver still deems to be valid they are not decoded correctly. Due to the non-acknowledgement of the parameter change signal, a second parameter change signal 48 is sent (corresponding to 49 in FIG. 3). After this, the DTUs transmitted following the first parameter change signal 48 are retransmitted, the retransmitted DTUs bearing reference numeral 420 and being labeled Retx₁ in FIG. 4D. In the example shown in FIG. 4D, the second parameter change signal 48 transmitted is acknowledged correctly with an acknowledgement signal 418. When this is received by the transmitter, in the embodiment illustrated with FIG. 4D a further parameter change signal 48 is transmitted and in this case acknowledged in 419. Following the third parameter change signal (which is not shown in FIG. 3, but which constitutes a further modification), the regular transmission continues corresponding to 312 in FIG. 3, i.e. it continues with transmitting DTU number Qtx+1, i.e. the DTU after the retransmitted DTUs after the second parameter change signal, possibly after a remaining part of a retransmitted DTU 421 is transmitted.

As already indicated, in some embodiments one positive acknowledgement 418 may be sufficient, and no third parameter change signal and no further acknowledgement 419 is needed. Furthermore, if for example the first acknowledgement signal 418 is not received correctly, the signals starting with the second parameter change signal 48 may be sent again in some embodiments.

It should be noted that in still other embodiments, only an acknowledgement signal for the parameter change signal may be implemented, for example the actions described with respect to 37 to 312 in FIG. 3 or the signals 48, 417, 420, 418 and possibly 419 in FIG. 4D may be implemented without using a parameter change ready signal like described with reference to 33 and 34 in FIG. 3.

Generally, corruption of signals shown as crossed out in FIG. 4D may be detected for example by missing acknowledge signals, or by an evaluation of the retransmission return channel, for example as a Golay code used is not correct or DTUs are not acknowledged, or by evaluating a DTU history information in the retransmission return channel.

Therefore, it is to be understood that the specific implementations of methods described serve only as non-limiting examples.

With embodiments as described with FIGS. 4C and 4D, a more robust parameter change is enabled, i.e. the probability that an error occurs is reduced due to the use of acknowledgements of the corresponding signaling. On the other hand, the duration of the parameter change is increased in theses embodiments with respect to the variants explained with reference to FIGS. 4A and 4B.

In still other embodiments, alternatively or also in addition to the above mechanisms involving the transmission of the parameter change ready signal and its acknowledgement and/or the acknowledgement of the parameter change signal, the transmitter and/or the receiver may be configured to detect that an error has occurred during the parameter change, for example based on a number of errors occurring during transmission of data transfer units. When such an error is detected, all or part of the online parameter change procedure may be repeated.

For example, in an embodiment after the receiver transmits a request for an online parameter change like request 40 of FIG. 4A, it may enter a wait state waiting for receipt of a parameter change signal like signal 48 of FIG. 4A. As soon as it receives the parameter change signal, the wait state is left again.

During the wait state, when a number of errors in received data transfer units exceeds a predetermined threshold within a given time, for example 80% or 90% of the overall number of data transfer units in a given time (or if the number of correctly received data transfer units falls below a predetermined threshold), for example a time delay_max which may be a maximum delay which is added to an overall transmission delay caused by retransmissions, the receiver takes this as an indication of an error during the parameter change. For example, a high number of errors in received data transfer units may be due to the fact that the transmitter has already sent the parameter change signal and applies the changed parameters, while the receiver erroneously has not received the parameter change signal and still applies the old parameters.

Additionally or alternatively, the receiver may take it as an indication of an error during the online parameter change when, after entering the wait state, no parameter change signal is received within a predetermined time, which may for example be a maximum transfer time of the parameter change request from receiver to transmitter plus delay_max plus one roundtrip time. This may for example occur when the parameter change request is not received by the transmitter correctly.

Additionally or alternatively, the receiver may take it as an indication that an error has occurred if a predetermined time, for example a roundtrip time, after transmitting the parameter change request it continues to receive "new" data transfer units, for example data transfer units with sequence identification higher by a predetermined threshold than sequence identifications received previously. This may be an indication that the transmitter has not received the request and has not stopped its data transfer unit framer.

In an embodiment, when the receiver has detected an indication of an error during the online parameter change, for example as explained above, it re-initiates the online parameter change by again sending the online parameter change request like request 40 of FIG. 4A.

In such an embodiment, when the transmitter receives this repeated online parameter change request, which in an embodiment has the same parameters as the initial request, it knows that the initial request has failed, e.g. due to the receiver not receiving the parameter change signal, and repeats all of or part of the online parameter change procedure. For example, the transmitter may "jump back" to sending the parameter change signal, e.g. continue operation at the end of phase 2 at 411 of FIG. 4A.

Additionally or alternatively, after sending a parameter change signal like signal 48 of FIG. 4A, the transmitter may enter a wait state. The transmitter may leave the wait state e.g. when the number of successfully transmitted data transfer units, i.e. positive acknowledged data transfer units, exceeds a predetermined threshold in a predetermined time period (or the number of not positive acknowledged data transfer units is below a predetermined threshold). The predetermined time period may for example be delay_max plus one roundtrip time, and the threshold my for example be 10% or 20% of the overall number of data transfer units during the predetermined time.

When the transmitter has been in the wait state for a predetermined maximum duration, i.e. when the criterion for leaving the wait state has not been fulfilled during this maximum duration, the transmitter may take this as an indication that an error has occurred during the online parameter change. In an embodiment, the maximum duration may be equal to or larger than delay_max plus one roundtrip time.

In this case, the transmitter may repeat all or part of the parameter change procedure. For example, the transmitter may "jump back" to sending the parameter change signal, e.g. continue operation at the end of phase 2 at 411 of FIG. 4A.

In some implementations of corresponding devices, for examples in devices as shown in FIGS. 1 and 2, may be designed to be capable of multiple variants of the above. The information which variant or modification shall be executed in some embodiments may be communicated or negotiated between transmitter and receiver, for example during handshake or training or in another part of initialization, during show time before requesting the parameter change or also in the corresponding phase 1 together with transmitting the new desired parameters, for example by incorporating a corresponding information in framing parameter change message 40.

The parameter change signal 48 may be transmitted in some embodiments also immediately after the parameter change ready signal, or a fixed number of symbols from the parameter change ready signals, for example after ceil (Qtx/(Q·S1))+1 symbols, Q being a number of Reed-Solomon code words per DTU and S1·Q being the DTU size in symbols.

In many cases, the parameters which for example are changed by an online parameter change are subjected to certain restricted ranges which may for example be defined in corresponding standards. In such situations it may occur that a desired online parameter change may take a specific parameter out of the range permitted by the respective standard or by other considerations like technology restraints, which is not desirable. In such a case, an embodiment now described with reference to FIG. 5 may be implemented to alleviate this. The embodiment of FIG. 5 may be implemented in conjunction with the embodiments described above, but may also be implemented independently therefrom.

Figure 5:
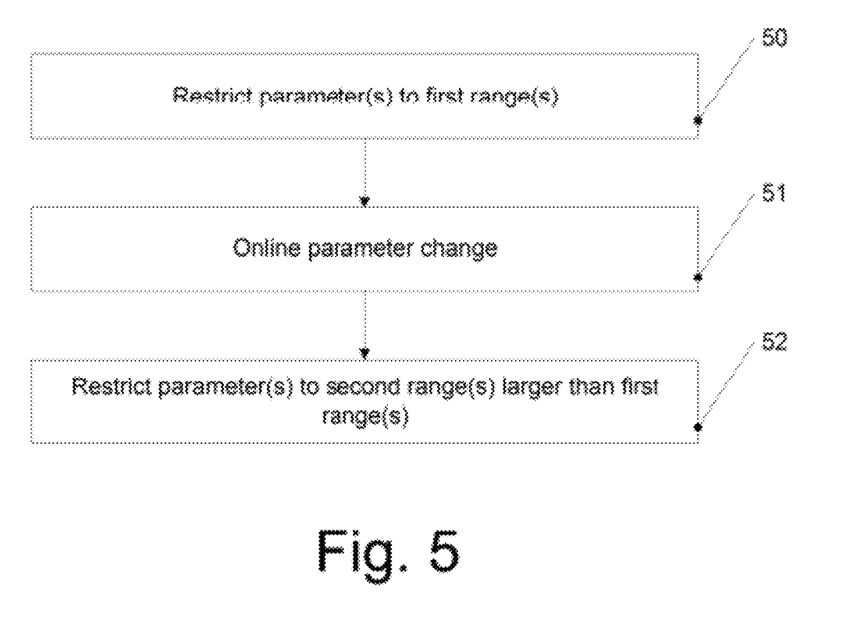
FIG. 5 shows a flow diagram illustrating an embodiment.

In the embodiment of FIG. 5, at 51 one or more parameters, for example framing parameters for a DTU framer, are restricted to corresponding one or more first ranges. An online parameter change at 51 may change the parameters. After the online parameter change, at 52 the one or more parameters are restricted to respective one or more second ranges, which are larger than the first ranges and encompass the first ranges. The second ranges may be ranges defined by a corresponding standard. In other embodiments, the second range(s) may be smaller than the first range(s) or differ from the first range(s) in some other manner, e.g. be shifted with respect to the first range(s).

By restricting the parameters to first ranges smaller than the second ranges prior to the online parameter change, in the embodiment of FIG. 5 the chance that the online parameter change leads to a violation of the second range is reduced.

Next, some examples for parameters which may be subjected to the method of FIG. 5 as well as corresponding ranges and some further embodiments will be described. The parameters mentioned in the following may also be parameters subjected to a parameter change in any of the embodiments discussed with reference to FIGS. 1 to 4D.

For example, the number of symbols per DTU frame may be restricted to a range. For example, if the number of symbols per DTU frames is denoted Q·S1, a second range may be between 0.5 and 4, and a first range in the embodiment of FIG. 5 may be smaller, for example between 1 and 3.

In particular, in an embodiment, the minimum for Q·S1 may be set to a·rif, a being the lower limit of the second range, for example 0.5, and ref being a margin factor, for example 1.5 or user configurable, for example as rif=1+RIF·0.1 with RIF being a value in a specific range, for example from zero (no margin) to ten.

For example, when setting up the parameters for example at initialization, Q·S1>0.5·rif may be taken as a hard constraint. In other embodiments, this parameter may be selected in dependence of an actual rate at this time, for example (Q·S1)>0.5·x, wherein x is chosen to be the minimum of rif and net_max/ndr, wherein net_max and ndr are given in kilobit per second, net_max representing a maximum net data rate which may occur in the system and ndr being the net data rate at the time when the bit parameters are set up, i.e. the actual data rate mentioned above. In xDSL systems using retransmission, ndr is equal to fs·L1·(1−(2+V+W)/(Q·Nfec1)), wherein fs is the data symbol rate expressed in ksymbols/s, L1 is the number of bits from latency path 1 (see FIG. 2) transmitted in each data symbol, V is a number of padding bytes per DTU, W is a number of DTU overhead octets related to the insertion of a cyclic redundancy check (CRC), Q as already mentioned is a number of Reed-Solomon code words per DTU and Nfec1 is a Reed-Solomon code word size in latency path 1 (see again FIG. 2 for explanations of latency path).

It should be noted that Nfec1 depends from other parameters, inter alia from M1, B10 and R1, M1 being a number of MBFs (MUX data frames) per Reed-Solomon code word, B10 being a number of octets per MBF in latency path 1 (for one bearer channel 0), and R1 being a number of redundancy octets per Reed-Solomon code words in latency path 1.

A similar consideration may apply to the upper boundary of Q·S1. In some embodiments, an exceeding of the corresponding maximum value allowed by the respective standard may be allowed. In other embodiments, similar to what was explained above for the minimum, a margin may be introduced. For example, as mentioned in some DSL standards Q·S1 is limited to values smaller than or equal to 4, and as the first range an upper value smaller than 4 may be selected. For example, the maximum of Q·S1 may be set to b/rdf, wherein b is the upper limit of the second range in FIG. 5, for example equal to 4, and rdf is a margin factor which may be set for example to 2 or may be user configurable, for example rdf=1+RDF·0.1, wherein RDF is selected for example from the range from zero (no rate degrees margin) to ten.

In initialization, Q·S1<b/rdf, for example <4/rdf, may be taken as a hard constraint or set in dependence of an actual data rate for a dedicated parameter calculation, for example (Q·S1)<4 (or general b)/x wherein x is the minimum of rdf and ETRu/ETR_min, ETRu being an unlimited version of expected throughput in kilobit per second and ETR_min being the minimum of the expected throughput in kilobits per second.

Another parameter which may be used in the method of FIG. 5 is a maximum delay which is added to an overall transmission delay caused by retransmissions. Devices incorporating such a maximum delay may for example discard DTUs which cannot be transferred without violating the limit. In some xDSL standards, this parameter is labeled delay_max.

In some embodiment, this parameter may set to a minimum required delay_max due to a particular noise configuration plus an extra margin. The extra margin may be greater than a typical roundtrip time in the system. For example, if a roundtrip time is 4 ms, the extra margin may be 5 ms. In such case, problems with a rate decrease violating this parameter are decreased.

In another embodiment, for generation of framing parameters instead of delay_max a parameter where from delay_max a constant roundtrip is subtracted taking account of the roundtrip time is used, i.e. delay_max-roundtrip. Roundtrip may be set to a fixed value, for example roundtrip=5. In other embodiments, roundtrip may be dependent on other parameters, for example roundtrip=ceil((HRT_s_TX+HRT_s_RX+1)·fDMT+(HRT_d_TX+HRT_d_RX+1)·DTUsize·fDMT) where DTUsize may be set to the maximum size of a DTU in symbols, for example to 4, ceil is a function generating the next larger integer, HRT_s_TX is the symbol part of the transmitter roundtrip times in DMT symbols, HRT_s_RX is the symbol part of the receiver half roundtrip time in DMT symbols, HRT_d_TX is the DTU part of the transmitter half roundtrip time in DMT symbols, HRT_d_RX is the DTU part of the receiver halt roundtrip time in DMT symbols, and fDMT is the rate of transmission of the symbols, in particular discrete multitone symbols, in kHz. In some embodiments, the DTU size parameter may also be set to Q·S1·rdf, wherein rdf is a margin parameter.

In still another embodiment, a delay parameter like delay_max may be adjusted as required or according to a configured limit. For example, for avoiding discarding DTUs due to violations of delay_max, a delay supervision of the transmitter and receiver may be adjusted such that a desired noise protection, for example impulse noise protection, is attained. In another embodiment, for example the parameter delay_max is used as a constraint for showtime entry, but in case of an online parameter change, for example a seamless rate adaptation, it is replaced by a greater value, for example by delay_max+delay_max_adder, where delay_max_adder may be a new additional parameter on g.ploam level in DSL systems which is under control of the operator and which may be set for example to 4 ms or 5 ms.

In another embodiment, additionally or alternatively the value Qtx, i.e. the time between two retransmissions corresponding to a size of a retransmission buffer, is set to a minimum value Qtx,min and not increased later. In another embodiment, Qtx is kept small according to Qtx=Qtx, min=ceil((HRT_s_TX+HRT_s_RX+1)/(Q·S1)+(HRT_d_TX+HRT_d_RX+1)) instead of letting increase Qtx to exceed Qtx,min, for example for meeting a configured noise scenario.

In still another embodiment, a difference between delay_max and a minimum required delay max could be maximized, which involves a weighting of two parameters which are to be maximized, namely the data throughput and the above-mentioned difference. This may be done using a similar approach as for Qtx above.

In further embodiments, additionally or alternatively Qtx is adapted in a way that an effective retransmission time which is for example equal to Qtx·Q·S1=Qtx·Q·8·Nfec1/L1 remains approximately constant, i.e. if L1 has to be decreased/increased by a factor of x, then Qtx in this embodiment is decreased/increased by a similar factor.

In such a solution, there may be the case that L1 and Qtx are changed and during this transition, there are ongoing retransmissions. In this case, it may happen that for a downshift of a rate in a seamless rate adaptation, there is an unsuccessful DTU transmission but the info unsuccessful is known only after the downshift, i.e. after a reduction of Qtx, which may lead to the particular DTU not being available anymore. Conversely, at the time of an increase of Qtx, it may happen that there is no data in the queue extension. In such a case, one approach may be to simply accept such errors and just flush the transmitters retransmission buffer. For the first mentioned error, a further possibility is to reduce Qtx not in one step, but reduce it stepwise until a target value is reached, wherein in a reduction step Qtx is reduced only by DTUs which have been positively acknowledged. In such a way, a probability of discarded DTUs due to delay_max violation may be reduced. For the second mentioned error, the extended queue may be filled up with dummy DTUs. For example, for forming dummy DTUs a reserved time stamp value, for example TS (time stamp)=255 may be used.

In still another embodiment, when the number of code words per DTU, for example Reed-Solomon code words per DTU, designated as above with Q, is changed, other basic framing parameters may be changed in some embodiments to ensure that a DTU for example contains an integer number of ATM cells or an integer number of PTM octet code words.

Furthermore, in some embodiments parameter Nfec1=M1·(B10+1)+R1 may be changed, for example by changing the value of B10, the parameters being defined as already described. If Q·Nfec1 is changed, problems may occur when there is an unsuccessful DTU transmission prior to the change, which, however, is known, i.e. reported by an acknowledgement or an expiry of a certain corresponding time corner only after the change. In some embodiments, such errors are simply accepted. In other embodiments, a retransmission buffer of a transmitter may be reformatted by mapping rules for DTUs which have to be retransmitted with a new DTU size in bytes. Based on sequence IDs and time stamps, the receiver is able to distinguish between "fresh" DTUs in the new format size and old retransmitted, reformatted DTUs. For example, when the DTU size in bytes is increased, the new DTU can be built by filling up the end of the previous DTU (in the old format) with dummy bytes. When the DTU size in bytes is decreased, when for example A_0 is the number of TPS-TC units in a DTU before the transition and A_1 the number of TPS-TC units in a DTU after the transition, the old DTU may be mapped to k=ceil (A_0/A_1) new DTUs, where all k DTUs get the sequence ID and time stamp of the old DTU, and if there is not enough data from the old DTU for the case new DTU, it may be filled up with dummy data.

In further embodiments, in addition to retransmission of DTUs after Qtx DTUs also REIN RTX blanking may be employed, REIN standing for Repetitive Electrical Impulse Noise and RTX designating the receiver. In such an embodiment, the transmitter has a REIN prediction logic which uses information for example from the retransmission return channel and does not transmit relevant data in data symbols which are predicted to be destroyed by REIN. No relevant data could mean for example that during a predicted REIN impulse, the last DTU before the predicted REIN impulse is retransmitted.

It should be noted that the above measures may be combined. For example, in an implementation the reduced margins for Q·S1 both for minimum and maximum together with the modification of delay_max by a roundtrip independence of a dedicated parameter constellation, in particular with DtuSize=Q·S1·rdf, together with the above-mentioned REIN blanking may be employed.

In some embodiments, special measures are taken in case a low power mode like the L2 mode of some xDSL standards is implemented together with retransmission. In this case, when switching between regular mode and low power mode, large changes of the data rate occur, which also affect the DTU rate.

In some embodiments, retransmission may be disabled when a low power mode is entered. In an embodiment, additionally a minimum net data rate during the low power mode is selected to be greater than a predetermined minimum, for example a minimum of 4 megabits per second. In particular, the minimum data rate is selected such that a control packet for controlling the transmission has a chance to reach the receiver correctly for a given REIN influenced channel. For example, the worst case for this scenario in ADSL2/2+ is that each REIN impulse destroys 7 DMT symbols (maximum value of a parameter INP_min_REIN is 7) and that the REIN period contains 32 DMT data symbols (120 Hz REIN with a sing symbol within the REIN period). With a net data rate of 4000 kilobit per second, thereof 4000/4/8=125 bytes per DMT data symbol, i.e. the REIN period contains 32·125 bytes where the first 7·125 are destroyed by the REIN impulse. A control packet with for example 1696 bytes can have 32·125 different positions within the REIN period where the first 7·125 positions and the last 1696 positions will lead to a destroyed packet. So the average probability that the packet reaches the receiver correctly without an error is (32·125−7·125−1696)/(32·125) 100%=35.7%, i.e. about one of three control packets reach the receiver without error.

In another embodiment, also in the low power mode no retransmission is used, and TPS-DC downstream input data is transmitted via latency path zero ($L_0$) overhead channel messages (see FIG. 2) instead of via latency path 1 in some manner. Thus latency path zero for example in the implementation of FIG. 2 uses interleaving and Reed-Solomon coding, this gives a more robust free transmission. In such an implementation, a new overhead channel message type may be implemented and a segmentation/reassembly functionality as overhead channel messages encapsulated for example in HDLC have a limit of 512 bytes. An appropriate value for the minimum rate of the message oriented overhead channel portion MSG_min, for example a recommended value 6 kilobit per second in ADSL2/2+ plus the required bandwidth for the control packets, for example 16 kilobits per second, may be set.

In a further embodiment, also no retransmission in low power mode is used, but the above-mentioned REIN blanking may be used.

Also these possibilities may be combined, for example in low power mode a net data rate <4 megabit per second and REIN blanking may be used. In such a solution, services like voice over IP may be established in low power mode.

It should be noted that while in the above embodiments specific examples for parameters as used in xDSL standards like G.992.3, G.992.5 or G.993.2 or as defined in G.998.4 which is currently under discussion are used, the corresponding principles may also be applied to other types of communication where similar parameters are used, for example a wireless communication with retransmission and forward error correction.

The invention claimed is:

1. A method, comprising:
   requesting an online parameter change with new desired parameters,
   stopping a data transfer unit framer to avoid generation of new data transfer units, and
   starting the data transfer unit framer with changed parameters to generate new data transfer units.

2. The method of claim 1,
   further comprising communicating a parameter change,
   wherein said requesting comprises sending a signal from a receiver to a transmitter, and
   wherein said communicating comprises sending a signal from the transmitter to the receiver to inform the receiver of the parameter change.

3. The method of claim 1,
   further comprising retransmitting stored data transfer units between said stopping and said starting.

4. The method of claim 1,
   further comprising starting the data transfer unit framer only after all data transfer units generated prior to said stopping have been acknowledged positive.

5. The method of claim 1,
   further comprising transmitting dummy data transfer units instead of positive acknowledged data transfer units between said stopping and said starting.

6. The method of claim 1,
   further comprising starting the data unit framer to generate data transfer units with changed parameters starting at a next data transfer unit boundary following a point in time assigned to the parameter change.

7. The method of claim 6,
   further comprising transmitting a remaining portion of a data transfer unit with parameters before the change of parameters between said point in time and said next data transfer unit boundary.

8. The method of claim 1,
   further comprising transmitting data symbols with the changed parameters starting at a point in time assigned to the parameter change.

9. The method of claim 1,
   wherein said starting the data transfer unit framer is performed only after said communicating a parameter change has been acknowledged.

10. The method of claim 1,
    further comprising restricting a parameter to a first range prior to said requesting, and
    restricting said parameter to a second range different from the first range after said parameter change.

11. The method of claim 1,
    further comprising detecting an error during execution of the method, and
    repeating at least part of the method if an error is detected.

12. A communication device, comprising:
    a transmitter, the transmitter comprising a data transfer unit framer,
    wherein the transmitter is configured to stop the data transfer unit framer to avoid generation of new data transfer units upon receipt of an online parameter change request, to communicate a parameter change and to start the data transfer unit with changed parameter to generate new data transfer units.

13. The device of claim 12,
    wherein the transmitter further comprises a retransmission queue,
    wherein the transmitter is further configured to start the data transfer unit framer only after all data transfer units in the retransmission queue prior to said stopping have been acknowledged positive.

14. The device of claim 13,
    wherein the transmitter is configured to replace acknowledged data transfer units in the retransmission queue by dummy data transfer units.

15. The device of claim 12, wherein the transmitter is further configured to transmit a signal parameter change ready signal, and to perform said communicating a parameter change only after the transmitter receives a acknowledgement for the parameter change ready signal.

16. The device of claim 12, wherein the starting of the data transfer unit is performed only after the communicated parameter change has been acknowledged.

17. The device of claim 16, wherein, when said parameter change is not acknowledged positive, the transmitter is configured to repeat communicating the parameter change and to retransmit data transfer units transmitted after the communicating of the parameter change.

18. The device of claim 12, wherein said transmitter is further configured to start the data transfer unit to generate new data transfer units with changed parameters starting at a next data transfer unit boundary following a point in time assigned to the parameter change.

19. The device of claim 12, wherein the transmitter is configured to repeat said communicating a parameter change if, after the starting of the data transfer unit framer, a number of not positive acknowledged data transfer units exceeds a predetermined threshold.

20. A communication device, comprising:
a receiver configured to receive data transfer units,
wherein the device is configured to transmit a parameter change request together with new parameters and to apply said new parameters after receipt of a parameter change signal,
wherein the device is further configured to monitor if an error occurs in the course of changing the parameters and to retransmit the parameter change request if an error is detected.

21. The device of claim 20, wherein monitoring if an error occurs comprises at least one of detecting errors in data transfer units exceeding a predetermined threshold or expiry of a time limit before receiving the parameter change signal.

22. A method, comprising:
requesting an online parameter change with new desired parameters,
stopping a data transfer unit framer to avoid generation of new data transfer units,
retransmitting data transfer units, and
starting the data transfer unit framer with the new parameters to generate new data transfer units.

* * * * *